United States Patent [19]
Douady

[11] Patent Number: 6,138,228
[45] Date of Patent: Oct. 24, 2000

[54] PROTOCOL AND BUS LINK SYSTEM BETWEEN COMPONENTS OF A MICRO-CONTROLLER

[75] Inventor: César Douady, Paris, France

[73] Assignee: T.Sqware Inc., Santa Clare, Calif.

[21] Appl. No.: 09/209,997

[22] Filed: Dec. 11, 1998

[51] Int. Cl.[7] .................................................. G06F 9/22
[52] U.S. Cl. ............................................. 712/33; 712/31
[58] Field of Search ..................... 710/21, 65; 708/204; 712/31, 33

[56] References Cited

U.S. PATENT DOCUMENTS

| | | | |
|---|---|---|---|
| 4,961,140 | 10/1990 | Pechanek | 710/105 |
| 5,235,683 | 8/1993 | Dahlerud | 710/21 |
| 5,854,939 | 12/1998 | Wallan | 712/41 |
| 6,032,178 | 2/2000 | Baciogalupo | 709/708 |
| 6,061,749 | 5/2000 | Webb | 710/65 |

FOREIGN PATENT DOCUMENTS

| | | |
|---|---|---|
| 0 348 672 | 1/1990 | European Pat. Off. . |
| 0 674 266 | 9/1995 | European Pat. Off. . |

*Primary Examiner*—Eric Coleman
*Attorney, Agent, or Firm*—Piper Marbury Rudnick & Wolfe

[57] ABSTRACT

A protocol and internal link system of a micro-controller in which components, interconnected by a parallel BUS link, exchange during a transaction successive messages on a plurality of clock cycles. A master transmitting component transmits, on a current clock cycle, to an addressee slave receiver component, an instruction message, encoded on N+p bits, and comprising a main field, N bits, and an auxiliary field, p bits, comprising an operation code, a signature identifying master and slave component and their transaction. A proof of transmission message and an acknowledgement message are transmitted from the master component to the slave component and vice versa on the following clock cycle. These steps are repeated on at least one subsequent clock cycle.

12 Claims, 6 Drawing Sheets

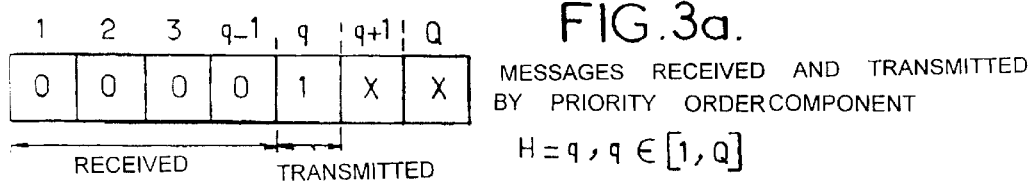
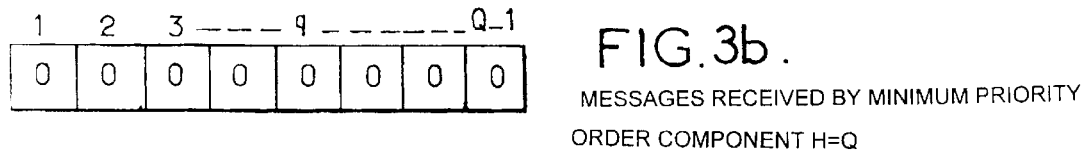
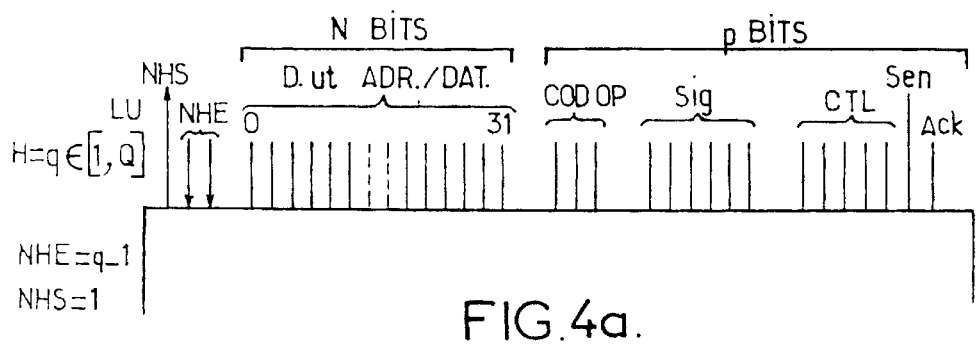
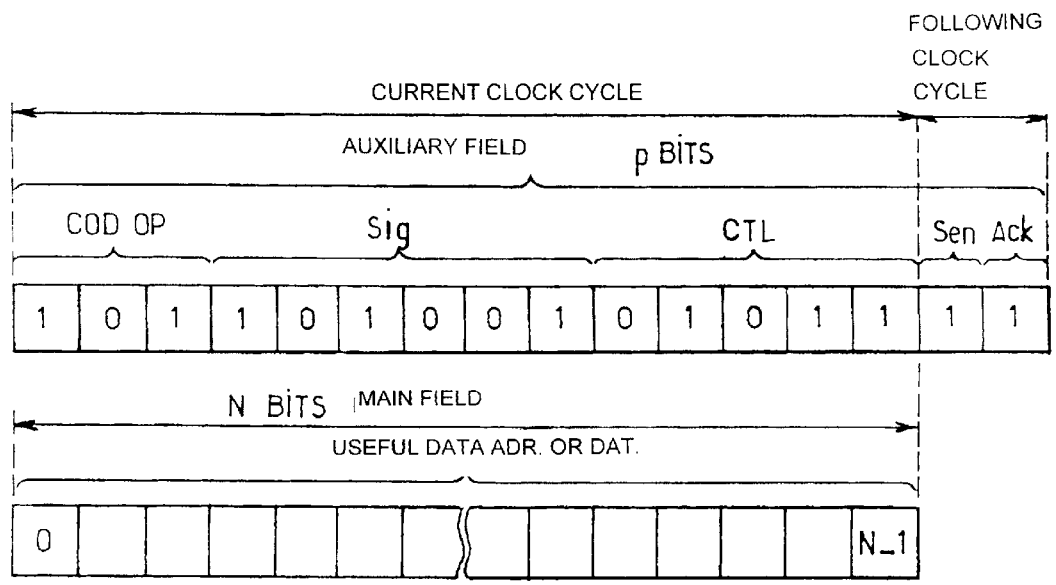

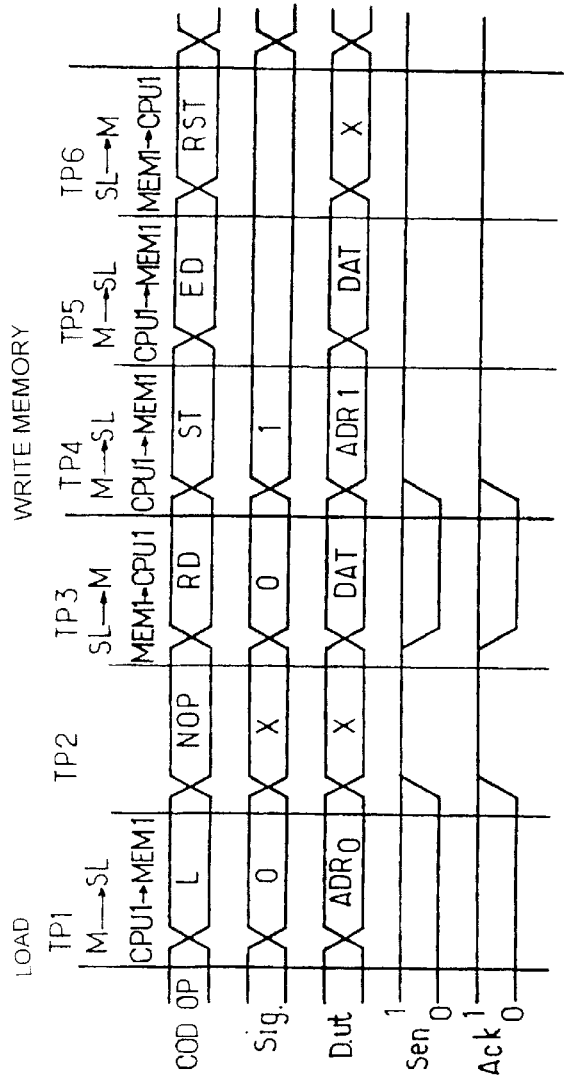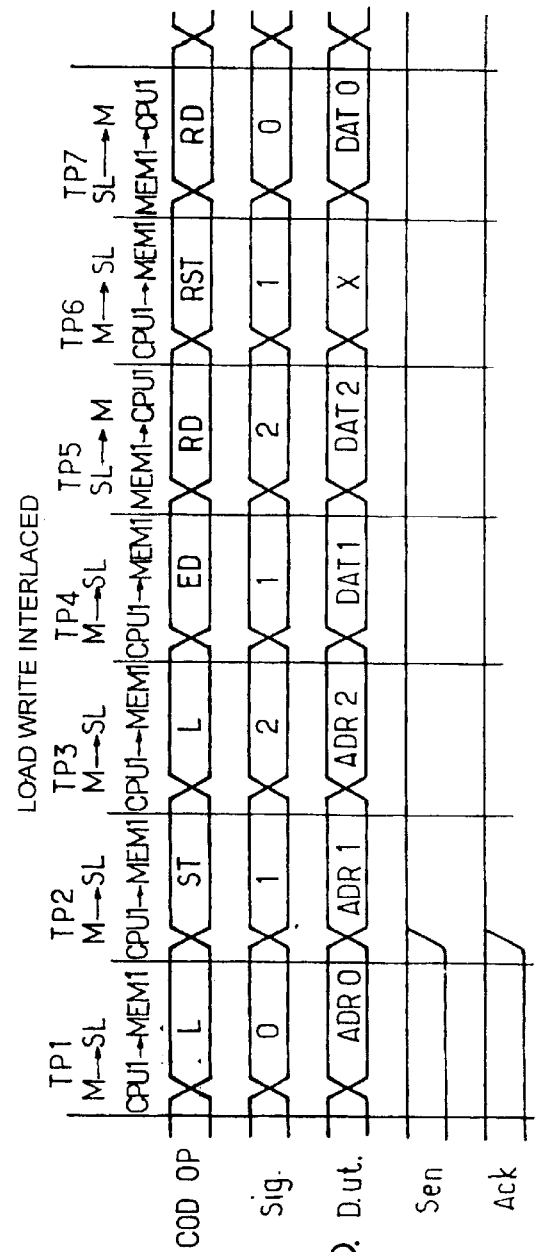
FIG.5a.
FIG.5b.

PROTOCOL AND BUS LINK SYSTEM BETWEEN COMPONENTS OF A MICRO-CONTROLLER

BACKGROUND OF THE INVENTION

1. Field of the Invention

In the information technology field, there is at the present time a tendency for central processing units to have an increasingly complex structure, because of continually increasing processing power objectives.

2. Brief Description of the Invention

In order to increase this last parameter, up till now it has been proposed, firstly, to insert between the central processing unit, such as a microprocessor, and the random access memory, a cache memory the access time of which is very much lower than the access time of the random access memory, often in a ratio of 10. As has been shown moreover in FIG. 1a, the cache memory is in fact subdivided into an instruction cache memory CI and a data cache memory CD, or addresses, each interconnected by a BUS link with the random access memory through a controller for example. Other link units such as controller or universal synchronous-asynchronous receiver-transmitters, USART, are interconnected with the BUS link so as to enable the central processing unit to start communicating.

Secondly, in order to further increase processing power, multilevel microprocessor structures have been proposed.

In the context of the disclosure of the object of the present invention, the notion of multiprocessors structure is not restricted to a given number of microprocessors, a monoprocessor structure, such as shown FIG. 1a, being also included in this notion. As a result, the terms microprocessor and micro-controller structure, directed to comprise one or more microprocessors, will be used without distinction.

These multiple structures, as shown for example in FIG. 1b, can include successively:

a general BUS, $BUS_0$, with which is interconnected by means of a controller a main memory, $RAM_0$, shared by the different microprocessors;

a plurality of microprocessor aggregates, each aggregate $A_1$ to $A_3$ comprising a specified number of microprocessors, being, clearly, interconnected to the general BUS and to the main memory by means of a controller;

an intercommunication conflict manager circuit, $ARB_0$, having a tree structure and directly interconnected to the controller, CNTRL, of each aggregate.

Generally, as will be seen moreover in FIG. 1b, the structure of each aggregate approximately reproduces that of the multiprocessors structure, relative to the aggregates, in so far as each aggregate is located around a local BUS $BUS_1$ to $BUS_3$ to which all the components of the aggregate under consideration are interconnected. As can be seen in FIG. 1b, any microprocessor of a specified aggregate is therefore interconnected, by means of a first cache memory, subdivided for example into instruction cache memory and data cache memory as shown in FIG. 1a, to the local BUS of the corresponding aggregate, which, by means of a controller, is interconnected to the general BUS, $BUS_0$. Each aggregate also includes a second cache memory $RAM_1$ to $RAM_3$ directly connected to the controller of the aggregate, the first cache memory of each microprocessor constituting a first level cache memory and the second cache memory a second level cache memory. Lastly, each aggregate includes a local intercommunication conflict manager circuit $ARB_1$ to $ARB_3$ also having a tree structure and interconnected to each first level cache memory of the corresponding aggregate.

The mode of operation of each constituent component of the multiprocessors structure, a component able to be constituted either by a constituent component of an aggregate, or by an aggregate itself or again by the main memory, is managed by an intercommunication protocol, complex, in which hierarchical or priority levels are allocated to each aforementioned component. Clearly it is understood that the number of hierarchical levels, general BUS, local BUS, is not moreover limited to two, as shown in FIG. 1b, a hierarchical level being associated with all the components interconnected to a local general BUS, several hierarchical levels of local BUS being conceivable in very complex structures.

Contrary to conventional BUS link systems used in known micro-controller architectures, such as MOTOROLA'S MC68000, in which the BUS link is blocked during the whole transaction time, in read or write mode, the intercommunication protocol for all the components is a protocol known in English by the term "split cycle", in which data packets are transmitted, the messages relative to the addresses and to the data being different and the data messages, particularly, being of different length, so as to enable maximum reduction in standby times, during which no message is transmitted on the BUS links.

The different length of the data messages entails, of necessity, predictive type intercommunication conflict risk management by the different intercommunication conflict manager circuits provided throughout the multiprocessors structure. Whatever the circumstances are, each intercommunication conflict manager circuit must, in order to empower any component placed under its authority, with which the latter is therefore interconnected, wait for any variable length data message transmission to be validated. For a more detailed description of a comparable mode of operation, reference can usefully be made to U.S. Pat. No. 5,265,635 enclosed within this specification as a reference. Such a mode of operation, complex, does make it possible to reduce standby and absence of message transmission by BUS times to the minimum, and therefore, in so doing, to optimise the logic pass band of this BUS link, at least for the longest data messages.

For a recapitulation of the main solutions brought to the management of conflicts of access and intercommunication between the different components of multiprocessors structures, reference can usefully be made to the work published by Kai Hwang, University of Southern California, and Fayé, Rice University, entitled "*Computer Architecture and Parallel Processing*", McGraw-Hill Book Company, pp.480 to 487.

OBJECTS OF THE INVENTION

The object of the present invention is to overcome the aforementioned drawbacks of the "split cycle" intercommunication protocol, by the implementation of a specific intercommunication protocol between components of a multiprocessors type structure in which the length variability characteristic of the data and/or address messages is eliminated.

A further object of the present invention is the implementation of a specific intercommunication protocol between components of a multiprocessors type structure, enabling the transmission of data or address messages of approximately the same length, on a specified number of clock cycles.

A further object of the present invention is the implementation of a specific intercommunication protocol between components of a multiprocessors type structure, in which the logic pass band of the BUS link between these components is optimized, whatever type of transaction occurs between the different types of these components.

A further object of the present invention is also, thanks to the implementation of a specific intercommunication protocol between components of a multiprocessors type structure, in which the address or data messages are approximately of the same length, a simplification of the process of intercommunication conflict management between components of the multiprocessors type structure.

A further object of the present invention is lastly, thanks to the implementation of the aforementioned intercommunication protocol between components of a multiprocessor type structure, the replacement of the FIFO type stock memory of each component of this microprocessors type structure by simple registers, corresponding to the fixed size of the messages transmitted, which enables the internal structure of these components and of these multiprocessors structures to be considerably simplified with a corresponding gain in integration levels.

SUMMARY OF THE INVENTION

The protocol for digital data transmission between constituent components of a micro-controller, the object of the invention, micro-controller in which each component is interconnected with another component by means of at least one parallel type BUS link enabling the transmission of messages, constituent of a partial transaction between two of these components, in accordance with a synchronous transmission from the clock signal, is remarkable in that it consists at least in transmitting from a request transmitting component, denoted the master component, to an addressee receiving component, denoted the slave component, on a current clock cycle, an instruction message comprising at least, on the one hand, a main field, encoded on N bits, containing a useful data word, communicated by the master component to the slave component, and, on the other hand, an auxiliary field comprising at least one operation code field enabling identification of the instruction message and a signature field enabling identification of the master component and the slave component addressee of this instruction message as well as the transaction occurring between this master component and this slave component. A proof of transmission message from the master component to the slave component and a reception acknowledgement message from the slave component to the master component are transmitted, simultaneously, on the clock cycle following this current clock cycle, the true value of the proof of transmission message and the true value of the acknowledgement message enabling this partial transaction to be validated. The previous stages are repeated on at least one clock cycle subsequent to the current clock cycle between the same pair of master-slave components so as to execute, by a response to this partial transaction, a transaction between this same pair of components, and between at least one other pair of master-slave components so as to ensure the execution of partial transactions and their responses, constituent of transactions, between these pairs of master-slave components.

The internal BUS link system between the different constituent components of a micro-controller, these components timed by a clock signal exchanging on each clock cycle at least one useful data word encoded on N bits between a request generator component, denoted the master component, and a receiver component, denoted the slave component, is remarkable in that this link is made by means of at least one N+p bits BUS link, each link enabling the generation of instruction messages encoded on N+p bits comprising, at least, on a same current clock cycle:

a main field comprising a useful data word encoded on N bits communicated by the master component to the slave component;

an auxiliary field encoded on p bits, this auxiliary field comprising at least one operation code field enabling identification of the instruction message and a signature field enabling identification of the master component and the slave component addressee of this instruction message as well as the transaction occurring between this master component and this slave component, and, on a clock cycle following the current clock cycle:

a proof of transmission message field from the master component to the slave component and an acknowledgement message field from the slave component to the master component, the true value of the proof of transmission message and the true value of the acknowledgement message enabling validation of a partial transaction between the master component and the slave component, each master or slave component interconnected with each BUS link comprising in addition:

a first and a second transmission register of instruction messages and a reception register of instruction messages, which makes it possible to ensure from each master or slave component the successive transmission of instruction messages on successive clock cycles to an addressee slave or master component, in accordance with a succession of partial transactions constituent of one transaction.

The protocol and the internal BUS link system between constituent components of a micro-controller, the objects of the invention, have application in the data processing technology industry in the context of the manufacture of work stations equipped with micro-controllers or microprocessors of very great processing throughput.

BRIEF DESCRIPTION OF THE DRAWINGS

They will be better understood by reading the description and by studying the drawings hereafter, in which, apart from FIGS. 1a and 1b relating to the prior art:

FIGS. 3a and 3b show, by way of illustration, the form of management messages of the conflict of access to the BUS link between different components so as to execute successive transactions, these management messages being transmitted unidirectionally from a given priority order component to all the components of a priority order lower than this priority order;

FIG. 4a shows, diagrammatically, an interfacing circuit of the BUS link, object of the invention, with a component, such as a microprocessor;

FIG. 4b shows the general appearance, in a non-restrictive example, of the main field and of the auxiliary field of an instruction or response message transmitted between two master-slave components of a micro-controller during a partial transaction between these components;

FIGS. 5a to 5d show timing diagrams relating to particular situations characteristic of the transmission of instruction and response messages during different transactions, according to the protocol object of the invention.

DETAILED DESCRIPTION OF THE PREFERRED EMBODIMENTS

A more detailed description of the protocol of digital data transmission between constituent components of a micro-controller, object of the present invention, will now be given in conjunction with FIGS. 2a, 2b and following.

Figure 2B:
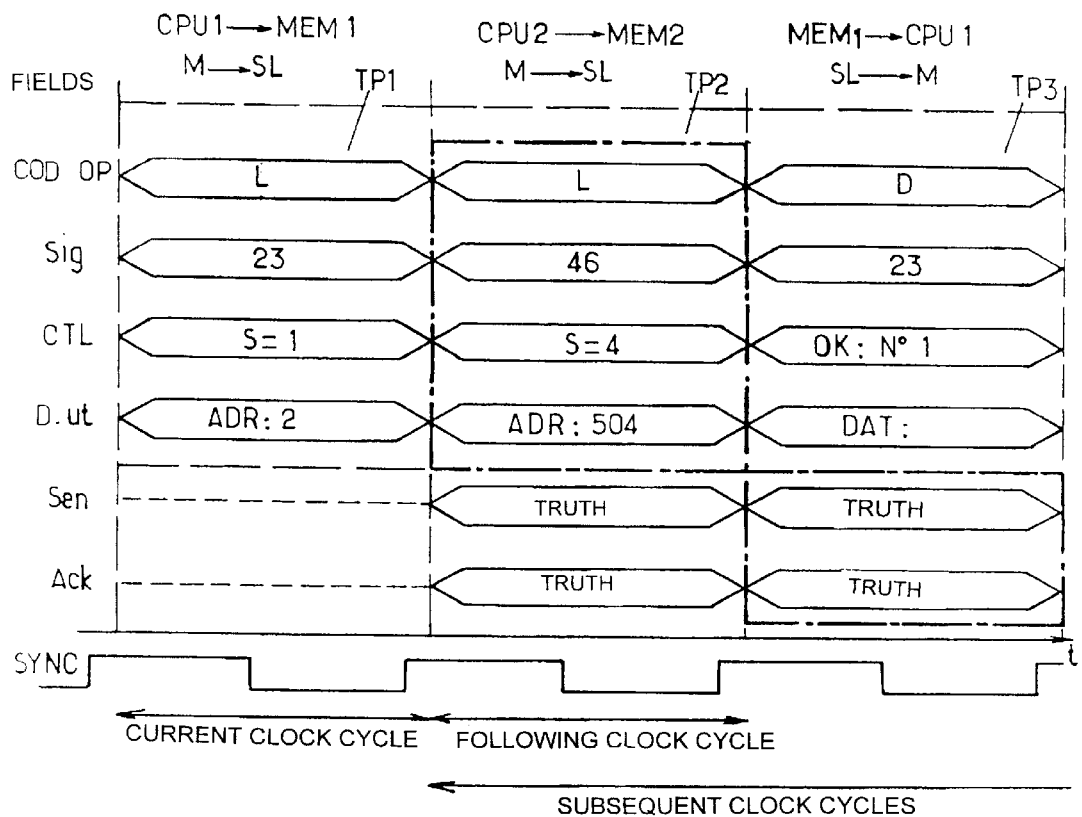
FIG. 2b shows an illustrative timing diagram of the essential stages in message transmission enabling the implementation of the data transmission protocol between constituent components of a micro-controller according to the object of the present invention.
Figure 2A:
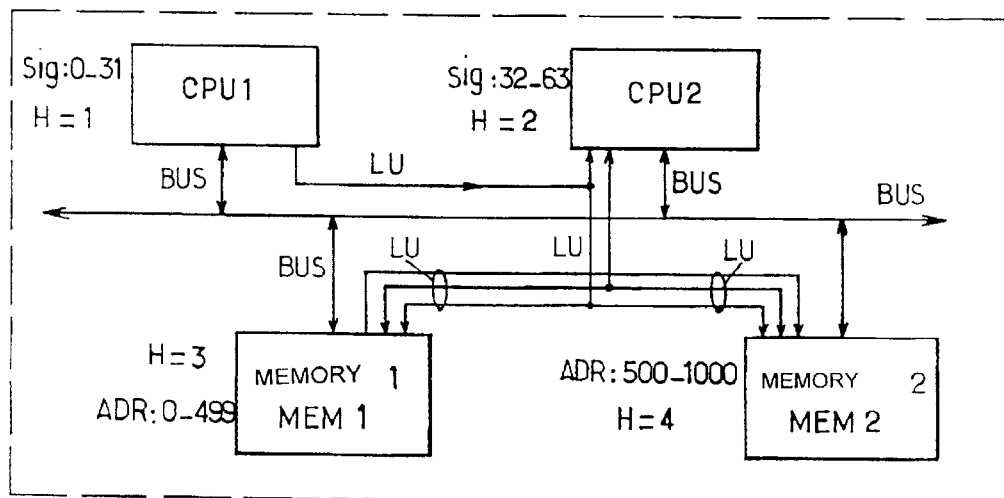
FIG. 2a shows, in the form of a block diagram, the general architecture of an internal BUS link system between the different components of a micro-controller, according to the object of the present invention.

In FIG. 2a, has been shown the internal structure of a micro-controller corresponding to the definition previously given in the description.

Figure 1A:
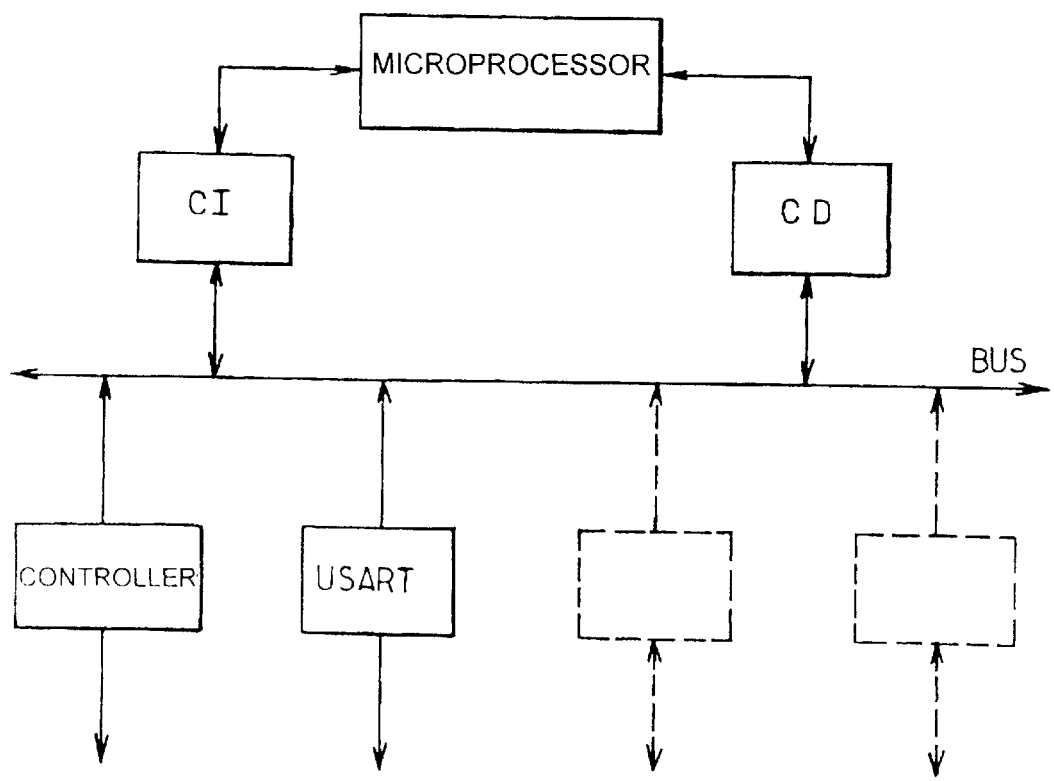
Figure 1B:
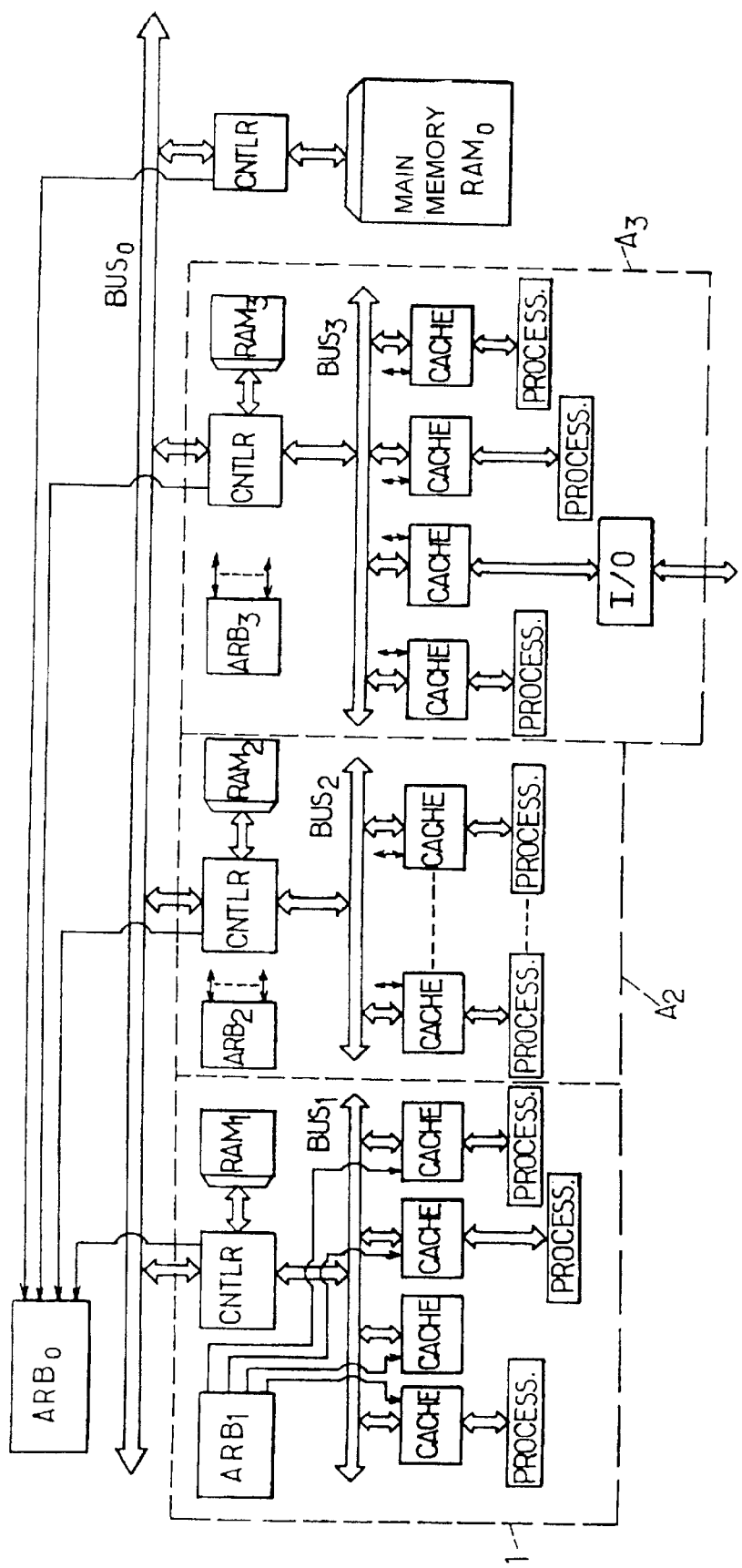

Thus, this structure may correspond, either to a mono-processor structure as shown in FIG. 1a, or on the contrary to a multiprocessor structure, i.e. to one of the aggregates $A_1$, $A_2$, $A_3$ shown in FIG. 1b for example. Clearly it is understood that the number of processors is not restrictive and that by way of example it is set at two in FIG. 2a, these processors bearing the references $CPU_1$, $CPU_2$. Likewise, these processors are interconnected by a BUS link with a first level 1 cache memory, $Mem_1$, and a second level 2 cache memory, $Mem_2$.

In a non-restrictive particular way, it is shown that each constituent component of the micro-controller is equipped with a set of different dedicated addresses and, as can be seen in FIG. 2a, to the memory $Mem_1$ are attributed addresses 0–499 for example and to the memory $Mem_2$ addresses 500 to 1000. These memories are, as previously mentioned, cache memories with very short access time, lower than or equal to 10 ns for example.

The digital data transmission protocol, object of the present invention, enables the transmission of successive messages during one transaction to be ensured for each component, as shown in FIG. 2a, interconnected with another component of the micro-controller by means of at least one parallel type BUS.

In a general way, the following definitions are given, in conjunction with FIG. 2b:

a partial transaction, denoted in the aforementioned figure $TP_1$, $TP_2$ or $TP_3$ by way of example between two of these components, consists of the sending by a first transmitter component, denoted the master component M, of a request containing an instruction message to a receiver component addressee of this request and denoted the slave component SL. In a general way, but in a non-restrictive way, the master components are constituted by the microprocessors $CPU_1$, $CPU_2$ and the slave components can be constituted by all the other components such as the memories $Mem_1$, $Mem_2$ shown in FIG. 2a, the input-output ports or others, although they are not shown in the aforementioned figure.

A partial transaction is also constituted by the response message to an instruction message and, consequently, by any response message addressed by the aforementioned slave component SL to the master component M originating the request. Additionally, it is shown that any response message essentially includes data as a function of the request, which was asked of it.

A transaction, again denoted a complete transaction, essentially consists of a first request message addressed by the master component M to the slave component SL and of at least one response message itself constituting a partial transaction, if need be of a plurality of these.

Clearly, all the aforementioned messages, i.e. successions of partial transactions, are transmitted according to a synchronous transmission from a clock signal, shown as SYNC in FIG. 2b, this clock signal clearly being constituted by a succession of a plurality of clock cycles as shown in the aforementioned figure. It will be noted that the start and end times of each partial transaction $TP_1$ to $TP_3$ are slightly shifted relative to the transitions of the clock signal Sync by a delay corresponding to the signal delay on the different lines or link BUS connecting all these components.

As is shown in addition in FIG. 2b, the digital data transmission protocol, the object of the present invention, consists firstly in transmitting, from a request transmitting component, the master component M, to the slave component SL on a current clock cycle, an instruction message, which is encoded on N+p bits, this instruction message corresponding to a partial transaction $TP_1$ to $TP_3$, shown in FIG. 2b.

The instruction message includes at least one main field encoded on the N bits, this main field including a useful data word communicated by the master component M to the slave component SL and, on the other hand, an auxiliary field encoded on p bits. This auxiliary field comprises at least one operation code field, denoted COD.OP, this operation code field enabling identification of the instruction message transmitted by the master component M to the slave component SL.

In a general way, it is shown that the operation codes in fact enable identification of the instructions given by the master component to the slave component, these instructions possibly consisting of an instruction to load useful data contained in a cache memory, constituting the slave component SL, in the master component M originating the request. As a non-restrictive example, it is shown that the operation code for the load instruction is denoted L and corresponds to a specified binary message.

As has also been shown in FIG. 2b, each instruction message comprises, in addition, in the auxiliary field, a signature field enabling identification of the master component M, the slave component SL addressee of this instruction message, and the transaction occurring between this master component and this slave component.

In order to ensure the implementation of signature messages adapted to this triple function, it is shown that to each master component M may be assigned a set of dedicated signature values Sig, signature values 0–31 for the microprocessor $CPU_1$ and signature values 32–63 for example for the microprocessor $CPU_2$. Clearly it is understood that the corresponding values are specified arbitrarily, with each arbitrary value of the set under consideration being associated a type of transaction and with the set of values associated with a master component being associated a specific and single master component.

As regards the identification of the addressee slave component SL for the transaction under consideration, it is shown that this identification can be made, as will subsequently be described in the description, by one-to-one correspondence of a signature value for the master component M under consideration and of the specific address of the aforementioned slave component SL, to which the instruction message is addressed, the transaction occurring between this master component and this slave component.

Clearly, the main field of the instruction message contains the useful data word D.ut for the transaction made, i.e. the useful data communicated by the master component M to the slave component SL during an instruction request, that is again the actual data transmitted by the slave component SL to the master component M during a partial transaction enabling response messages to be sent to the aforementioned master component M.

Thus, the useful data word contained in the main field is constituted by an address data word of the addressee slave component SL or by a digital data word to be read, during a load transaction, or to be stored, during a write to memory instruction. The useful data word of the first partial transaction between the master component and the slave component is constituted by the address data of the slave component, address data 0–499 for the $Mem_1$ memory and 500 to 1000 for the $Mem_2$ memory for example of the slave component SL concerned.

It is mentioned in addition that all the subsequent partial transactions constituent of the same transaction between the same pair of master-slave components comprise a useful data word constituted by the digital data to be read or stored.

Lastly, the protocol, the object of the present invention, consists, as shown in FIG. 2b, in transmitting simultaneously on the clock cycle following the current clock cycle, a proof of transmission message, denoted Sen, between the master component M to the slave component SL, and an acknowledgement message, denoted Ack, from the slave component SL to the master component M.

As shown in FIG. 2b, it is shown that instruction messages are thus interlaced in so far as, as shown in the aforementioned figure, the partial transaction $TP_1$ emanating from the master component M $CPU_1$ to the slave component SL, $Mem_1$, is deemed to occur first, on the current clock cycle, a second partial transaction $TP_2$ between the master component $CPU_2$ and the slave component SL, $Mem_2$, is deemed to occur on the following clock cycle, this second partial transaction constituting in fact the first partial transaction for the master component $CPU_2$, and a third partial transaction $TP_3$ is deemed to occur between the slave component SL, $Mem_1$ and the processor $CPU_1$ master component M, this third partial transaction $TP_3$ consisting in fact of a response message to the first partial transaction $TP_1$.

It may thus be noted that partial transactions are not only interlaced but also embedded in so far as, for any partial transaction occurring on a current clock cycle, the proof of transmission message Sen from the master component M to the corresponding slave component SL and the acknowledgement message Ack from the slave component SL to the originating master component M, as well as for all partial transactions relating to response messages occurring on a subsequent current clock cycle, the corresponding proof of transmission and acknowledgement messages transmitted on the clock cycle following this current clock cycle and the main field and auxiliary field messages other than these proof of transmission and acknowledgement messages therefore appear embedded on two successive clock cycles, the current clock cycle and the following clock cycle, as shown in the aforementioned FIG. 2b in dot-and-dash lines, for the partial transactions $TP_2$ and $TP_3$.

It is shown in addition that the true value of the proof of transmission message and the true value of the acknowledgement message enable validation of the partial transaction under consideration, i.e. the partial transaction which has occurred on the current clock cycle, which is then validated on the following clock cycle.

Clearly it is understood that the stages previously mentioned in the description may then be repeated on at least one clock cycle subsequent to the current clock cycle between the same pair of master-slave components, i.e. between the pair $CPU_1$ and $Mem_1$, or $CPU_2$ and $Mem_2$ respectively, and between at least one pair of different master-slave components, i.e. for example in the non-restrictive case in FIG. 2a, between the processor CPU, and the memory $Mem_2$ and the processor $CPU_2$ and the memory $Mem_1$ respectively, so as to ensure the execution of successive partial transactions, constituent of successive transactions between these pairs of master-slave components.

As also shown in FIG. 2b, it is indicated that, in order to ensure complete control of the partial transactions and in the end of all the transactions made between the different pairs of constituent components of the micro-controller, the auxiliary field may be equipped with a control field, denoted CTL, enabling each partial transaction and each transaction to be controlled. The aforementioned control field may consist of information encoding relative to the size of the transaction, i.e. in the end to the number of useful data words D.ut, constituent of a specified transaction. In the example given in FIG. 2b, it is shown that the transaction between the master component $CPU_1$ and the slave component $Mem_1$ consists simply of a transaction of a size S=1, i.e. of a single useful data word. In this case, the response message constituted by the partial transaction $TP_3$ may include, in the control field CTL, a validation message of the transmitted word, this validation message being able to comprise in particular the number of the transmitted word and thus enabling an end of transaction indication to be given when, in particular, the number of the transmitted words corresponds to the size, in numbers of words, of the first transaction $TP_1$ or corresponding instruction request message.

As a non-restrictive example, it is shown that:
the main field containing the useful data word, i.e. the address word or the read or written data word, may be encoded on N=32 bits.
the auxiliary field may to advantage consist of:
an operation code field encoded on 3 bits,
a signature field encoded for example on 6 bits,
a control field CTL encoded for example on 5 bits,
the proof of transmission and acknowledgement fields each encoded on one bit.

The general mode of operation of the protocol object of the present invention, is then as follows:
the first partial transaction $TP_1$ enables transmission by the master component M of an instruction message in which are associated in one-to-one correspondence the signature relating to the transaction requested by this master component and the address of the slave component SL intended to receive the corresponding request;
the corresponding slave component SL receives the aforementioned instruction message by virtue of the selective address which has been attributed to it, and then stores the value of the signature contained in the signature field of the message received in its internal storage circuits. This signature value is kept in storage by the slave component SL so long as the end of the transaction has not occurred, i.e. so long as the slave component SL has not transmitted the last partial transaction for which the last word corresponding to the number of words contained in the control field CTL, for example the size S=4 for the transaction between the processor $CPU_2$ and the memory $Mem_2$ shown in FIG. 2b, has not been transmitted and as long as the acknowledgement message Ack has not been transmitted on the clock cycle following the aforementioned current clock cycle. Clearly it is understood that in the case of the non-restrictive example in FIG. 2b, the current clock cycle for the transaction $CPU_1$, $Mem_1$ corresponds to the partial transaction $TP_1$, that the clock cycle following this current clock cycle in fact constitutes the current clock cycle for the partial transaction $TP_2$ relative to the processor $CPU_2$ and to the memory $Mem_2$, and so on for successive clock cycles.

Also it is understood that, the clock cycles being successive and not separated, as a consequence, the partial transactions are also successive and not separated, but that, in contrast, the response messages to a request may however be separated, i.e. made on subsequent and spaced out clock cycles of any number of clock cycles and partial transactions. The effective mode of operation of the protocol object of the present invention will be described subsequently in the description in four specific cases, so as to give a better illustration of the different possible modes of operation.

Clearly it is understood that in order to ensure the absence of message transmission conflict between the different constituent components of the aforementioned micro-controller, in particular when the number of constituent components of this micro-controller is particularly large, a single message having to be present on the n+p bits BUS link previously described in the description, a message being constituted on a current clock cycle by the main field and by the auxiliary field including the proof of transmission and acknowledgement messages of the previous partial transaction, the protocol object of the present invention may comprise a procedure for controlling conflicts of access to the transmission of messages from the different constituent components of the micro-controller. To this end, as shown in FIGS. 3a and 3b, the protocol object of the present invention consists in allocating to each constituent component of this micro-controller a transaction priority order. In FIG. 2a, it is shown that the transaction priority order is denoted by the variable H corresponding to a hierarchical coefficient. As a non-restrictive example, the processor $CPU_1$ benefits from a priority or hierarchical coefficient H=1 of smallest value but corresponding to the highest point of the hierarchy, the processor $CPU_2$ benefits from a hierarchical or priority coefficient value H=2, a higher value but corresponding to a lower priority, and so on for the slave components, $Mem_1$ and $Mem_2$ for which the hierarchical coefficient value is H=3, H=4. The value of the coefficients is arbitrary and corresponds in this particular case to a lowest value for a highest priority or hierarchy, and vice versa.

Each of the aforementioned components being equipped with the aforementioned hierarchical or priority coefficient, the protocol object of the present invention then consists in transmitting, from each higher priority order component, an authorization or absence of authorization of transaction message to all the lower priority order master-slave components. This authorization or absence of authorization of transaction message constitutes in fact for each aforementioned higher priority order component an instruction of withdrawal of access to the transmission of partial transactions to the benefit of all lower priority order components.

In FIGS. 3a and 3b, such messages have been shown for a number of hierarchical coefficients H=q, q∈[1, Q], where q denotes the hierarchical coefficient value H for the component under consideration.

Given the transmission of the aforementioned authorization or absence of authorization of transaction message to all the lower priority order master-slave components, it is indicated, as shown in FIG. 3a, that any component to which a hierarchical coefficient H=q has been allocated in fact receives an authorization or absence of authorization of transaction message from all the higher hierarchical order components, i.e. those with hierarchical or priority coefficient values of between 1 and q−1, whereas this same component with a hierarchical coefficient equal to H=q itself transmits an authorization or absence of authorization of transaction message to all the lower priority order master-slave components, i.e. with a hierarchical or priority coefficient of H∈[q+1, Q].

In accordance with a particularly advantageous aspect of the protocol object of the present invention, it is shown that each given priority order component q is then allowed to execute a transaction under conditional authorization by all the priority order components higher than this given priority order, i.e. by all the components with a hierarchical or priority coefficient of the value H∈[1, q−1].

According to another particular aspect of the protocol object of the present invention, it is shown that the minimum priority order component, i.e. the one for which H=Q, receives all the authorization of transaction messages delivered by the higher priority order components, i.e. all the authorization or absence of authorization of transaction messages delivered by the components with a hierarchical or priority coefficient such as H∈[1, Q−1].

According to a particular aspect of the protocol object of the present invention, it is shown that the minimum priority order component H=Q is allowed, either to execute no transaction, or to execute at least one arbitrary transaction under conditional authorization of all the higher priority order components.

In a particular embodiment, it is shown that the conditional authorization of all the higher priority order components is obtained for the complemented value of the true value, value zero, from all the authorization of transaction messages delivered by these higher priority order components. As shown in FIG. 3a notably, it is then indicated that the component with the hierarchical coefficient H=q is allowed to transmit a partial transaction when the value of all the authorization of transaction messages delivered by all the higher hierarchical order components is zero and when the value of the authorization or absence of authorization of transaction message delivered by this component with the hierarchical coefficient H=q is itself 1, these messages being delivered to all the components with a hierarchical order coefficient corresponding to a lower order. The value 1 of this message then enables the transmission of a request or response message by all the hierarchically lower components to be inhibited, whereas all the hierarchically higher components have withdrawn to the advantage of the component with the hierarchical coefficient equal to q.

As regards the minimum priority order component, as shown in FIG. 3b, i.e. the component where the value of the hierarchical coefficient is Q, it receives all the authorization or absence of authorization of transaction messages delivered by the components where the value of the hierarchical coefficient is H∈[1, Q−1]. This latter component clearly does not transmit any authorization or absence of authorization of transaction message. It can however transmit a partial transaction only when the value of all the authorization or absence of authorization messages that it receives has the complement of the true value, i.e value zero.

In such a case and as a function of the activity of the component, from the point of view of the transmission of a response transmission message for example, it is mentioned that, in the absence of transmission of a response message to a request from a master component, this latter minimum priority order component then transmits systematically on the BUS link an arbitrary partial transaction, constituting moreover a transaction in so far as it does not call for any response from another component. This transaction is defined by a particular operation code, denoted Nop.

The message corresponding to the arbitrary transaction then has a simplified character in so far as it includes solely the aforementioned operation code and, if need be, a dummy address enabling all hierarchical components higher than this minimum priority order component to receive such an arbitrary transaction message. Such a mode of operation in fact enables the link set up in this way to be controlled overall by enabling any higher hierarchical order component to take over in order to send a request message for example.

A more detailed description of an interfacing circuit of the BUS link, object of the present invention, i.e. in other words of the parallel input-output port ensuring the interconnection between a master component and a slave component previously described in the description, will be given in conjunction with FIG. 4a.

As will be seen in the aforementioned figure, the interfacing circuit includes N input lines in parallel, enabling transmission of the main field encoded on N bits, and clearly the parallel p lines enabling transmission of the auxiliary field encoded on p bits.

Thus, in the previously described embodiment, the interfacing circuit may include in parallel the three conductors enabling transmission of the operation code field COD.OP, six conductors enabling transmission of the signature field, five conductors enabling transmission of the control field CTL, and two conductors enabling transmission of the proof of transmission field Sen and of the reception acknowledgement field Ack.

In addition, it is shown that the aforementioned interfacing circuit includes a unidirectional link of which the number of conductors is dependent on the hierarchical coefficient attributed to the component under consideration.

In FIG. 4a, have been shown in a non-restrictive way the interfacing circuit and the unidirectional line LU for a hierarchical coefficient H=q=3 of FIG. 2a, i.e. for the memory $Mem_1$. This unidirectional line LU then includes a number of conductors receiving the authorization or absence of authorization of transaction messages from components with a higher hierarchical coefficient, i.e. a number of input conductors NHE=q−1, this unidirectional line LU being in addition completed by a line enabling transmission of the authorization or absence of authorization of transaction message to components of a lower hierarchy. The number of output conductors is NHS=1 for all the components except the one with the minimum hierarchical coefficient, for which the number of output conductors NHS is zero.

The appearance of the messages transmitted on the N+p bits parallel BUS is given in FIG. 4b for the current clock cycle and the following clock cycle.

A more detailed description of four specific examples corresponding to significant particular cases of transmission of partial transactions will be given in conjunction with FIGS. 5a to 5d.

FIG. 5a shows the case where a master component, such as processor $CPU_1$, addresses successively to a slave component memory $Mem_1$ for example, a load instruction then a write instruction.

The aforementioned load and write to memory instructions are deemed to be executed in the absence of corresponding data transmission or encoding error, i.e. that each partial transaction necessary to the implementation of these operations on a current clock cycle is followed on a following clock cycle by proof of transmission messages Sen and by an acknowledgement message Ack at the true value.

In the case of the load instruction and as a purely illustrative example, the corresponding transaction is deemed made on three successive partial transactions, partial transactions $TP_1$, $TP_2$ and $TP_3$.

The partial transaction $TP_1$ corresponds to the sending by the processor $CPU_1$ of a loading request message including a load indicator operation code field L, a signature field taken at value zero for example, and a useful data field corresponding to the address $ADR_0$ of memory $Mem_1$. During the partial transaction $TP_1$, this partial transaction being presumed the first, or following an arbitrary transaction transmitted by the component with the lowest hierarchy, as previously mentioned in the description, the proof of transmission and acknowledgement messages Sen, Ack are the complement of the true value, i.e. at value zero.

The partial transaction $TP_2$ corresponds, as a purely illustrative example, to an arbitrary transaction, i.e. a transaction in the absence of operation. This partial transaction corresponds to an operation code field Nop and to a signature and to useful data, which is non-significant and for this reason denoted X. The following partial transaction $TP_3$ corresponds to a response message from the slave component SL to the master component M, i.e. from the memory $Mem_1$ to the processor $CPU_1$. The response message transmitted then includes a significant operation code data response RD field and in the signature field, a signature message identical to that of the partial transaction $TP_1$, whereas the useful data field D.ut includes data read in the memory at the address indicated in the useful data field of the partial transaction $TP_1$.

In addition, during this partial transaction $TP_3$ and by virtue of the fact that the message transmitted during the previous partial transaction $TP_2$ was an absence of operation message or arbitrary message Nop, the proof of transmission or acknowledgement messages transmitted during the transaction $TP_3$ correspond to the complemented value of the true value.

The following transaction concerns a write to memory instruction on the partial transactions $TP_4$, $TP_5$ and $TP_6$.

Such a transaction is also deemed made on three partial transactions. The first partial transaction $TP_4$, of the transaction relating to the write to memory is a write request transmitted by the processor $CPU_1$ to the memory $Mem_1$ for example. This request is a write instruction request comprising a corresponding operation code, denoted ST, a signature message with a given value of 1 for example, and in the main field, an address message corresponding to the address $ADR_1$ of the memory $Mem_1$ where the data to be entered will have to be stored. By virtue of the antecedents of the partial transaction $TP_3$ where the previous load operation had been executed, the messages relating to the proof of transmission or acknowledgement Sen and Ack are both at the true value.

The following partial transaction $TP_5$, corresponds to an instruction for communication by the master component $CPU_1$ of data to be entered in the memory $Mem_1$. The message transmitted includes an operation code field for transmitting or sending data ED, a signature field the signature value of which is identical to the signature field of the previous partial transaction $TP_4$, and a useful data field containing the data to be entered in the memory $Mem_1$. By virtue of the execution of the write instruction to the previous partial transaction $TP_4$, it is understood that during the transaction $TP_5$, the proof of transmission Sen and acknowledgement Ack messages are also at the true value.

Lastly, the final transaction $TP_6$ relating to the write to memory instruction shown in FIG. 5a, consists of a response message from the slave component SL to the master component M, i.e. from the memory $Mem_1$ to the processor $CPU_1$. This response message includes an operation code field of status restitution RST, an identical signature message, i.e. to the given value 1 as an example for the two prior partial transactions $TP_4$ and $TP_5$, and a non significant useful data field, denoted for this reason by the value X. Given the execution of the prior partial transaction $TP_5$, the proof of transmission Sen and acknowledgement Ack messages are also at the true value.

It can thus be noted that the signature field enables in every case any partial transaction constituent of a transaction to be addressed to the chosen slave component, by bringing this signature value into one-to-one correspondence with the address of this chosen slave component at the time of the instruction request transmitted by the master component M to the slave component SL during the transmission of the first partial transaction.

FIG. 5b shows a situation in which successive data load-write instructions and their response are transmitted by a master component, such as the microprocessor $CPU_1$, and a slave component, such as the memory $Mem_1$ for example, or if need be, by different master components, $CPU_1$, $CPU_2$, as shown in FIG. 2a. As a non-restrictive example, FIG. 5b will be described in the case where the successive partial transactions are generated by a single microprocessor $CPU_1$ to the first or the second cache memory $Mem_1$, $Mem_2$, or one of these, in the following conditions:

the first partial transaction $TP_1$ is deemed to consist of a load instruction message comprising the operation code message field L, a signature field of arbitrary value zero corresponding to this loading for this microprocessor $CPU_1$, and a useful data field D.ut corresponding to an address value, denoted $ADR_0$, the address value of the first cache memory $Mem_1$ for example, from which the data stored at this address must be loaded in the registers of the central processing unit $CPU_1$. This partial transaction $TP_1$ being deemed the first, the proof of transmission and acknowledgement messages Sen and Ack are at the complemented value of the true value.

The second partial transaction $TP_2$ occurs on the following clock cycle and corresponds for example to a write instruction transmitted by the same central processing unit $CPU_1$ to the same cache memory $Mem_1$, clearly to a different address $ADR_1$. The corresponding instruction message includes an operation code ST, a signature value different from the previous one, equal to 1, and in the useful data field, the address value of the cache memory $Mem_1$ in which the corresponding data will have to be entered. The proof of transmission and proof of acknowledgement message field on this clock cycle following the current clock cycle of the previous partial transaction $TP_1$ is then equal to the true value, the previous partial transaction $TP_1$ being deemed validly executed.

The partial transaction $TP_2$ is itself followed by a third partial transaction $TP_3$ consisting again for example of a load instruction in the central processing unit $CPU_1$. The instruction message corresponding to this partial transaction includes an operation code field L, a signature field of arbitrary value equal to 2. It will be noted particularly that the value of the signature for the same load instruction as in the case of the partial transaction $TP_1$, for the same microprocessor or central processing unit $CPU_1$, is different. Indeed, a same signature value for a same master component and for a same instruction can be attributed by this master component only when all the responses to a prior request relating to a same instruction have been received and the corresponding transaction is therefore validly executed. Clearly, the useful data fields of the second partial transaction $TP_2$ includes an address value $ADR_2$ of the same first cache memory, this address value being different from the address value of the previous partial transaction $TP_2$. During this partial transaction $TP_3$, the proof of transmission and acknowledgement messages are also at the true value, the previous transaction being deemed validly executed.

The following partial transaction $TP_4$ is a confirmation message of the write instruction given by the master component $CPU_1$ to the cache memory $Mem_1$ during the partial transaction $TP_2$. The confirmation message includes an operation code field corresponding to a data ED send header, a signature field of the same value as that of the signature field of the corresponding instruction message at the time of the partial transaction $TP_2$, and clearly, a useful data field constituted by the data denoted $DAT_1$ to be stored at the address $ADR_1$ of the first cache memory $Mem_1$. It is noted that this partial transaction $TP_4$ does not end the transaction between the central processing unit $CPU_1$ and the cache memory $Mem_1$ for the write instruction given by this central processing unit at the time of the partial transaction $TP_2$. The Sen and Ack messages are also deemed to correspond to the true value.

The following transaction $TP_5$ constitutes a response message to the load instruction generated by the central processing unit $CPU_1$ during the partial transaction $TP_3$. The response message includes a response data RD operation code field, a signature field comprising a signature value identical to that of the corresponding signature value of the instruction message generated during the partial transaction $TP_3$, and a useful data field D.ut corresponding to data intended to be loaded in the central processing unit $CPU_1$ from the address $ADR_2$ of the cache memory $Mem_1$. It will be noted that this response message ends the load transaction thus constituted by the partial transaction $TP_3$ and the partial transaction $TP_5$.

The following partial transaction $TP_5$ is deemed to correspond to a response message of status of communication of the cache memory $Mem_1$ having received the write instruction at the time of the partial transaction $TP_2$, received the data to be written during the partial transaction $TP_4$, and, following the completion of this writing, transmitting the execution response message during the partial transaction $TP_6$. This response message includes thus an operation code field of status response RST, a signature field comprising a signature value equal to that contained in the signature fields of the transactions $TP_2$ and $TP_4$. The useful data field on the other hand is not significant, and, for this reason, is denoted X. The partial transaction $TP_6$ ends the transaction relating to a write instruction constituted by the partial transaction $TP_2$, the partial transaction $TP_4$, and the partial transaction $TP_6$.

Lastly, the final partial transaction $TP_7$ is no more than a response message from the slave component SL constituted by the cache memory $Mem_1$ to the central processing unit $CPU_1$, to the load request generated at the time of the partial transaction $TP_1$. This final partial transaction $TP_7$ includes an operation code field relating to the response data RD, a signature field comprising a signature value equal to that of the first transaction $TP_1$, and a useful data field constituted by the data read at the address $ADR_0$ of the cache memory $Mem_1$ and loaded in the central processing unit $CPU_1$, this data being denoted $DAT_0$. This final partial transaction ends the load transaction formed by the partial transactions $TP_1$ and $TP_7$.

In the case in FIG. 5b, it is mentioned as a non-restrictive example that all the partial transactions have been executed on the first clock cycle which has been assigned to them and that, as a consequence, the acknowledgement and proof of transmission messages Ack, Sen, are all at the true value from the second partial transaction $TP_2$.

Figure 5C:
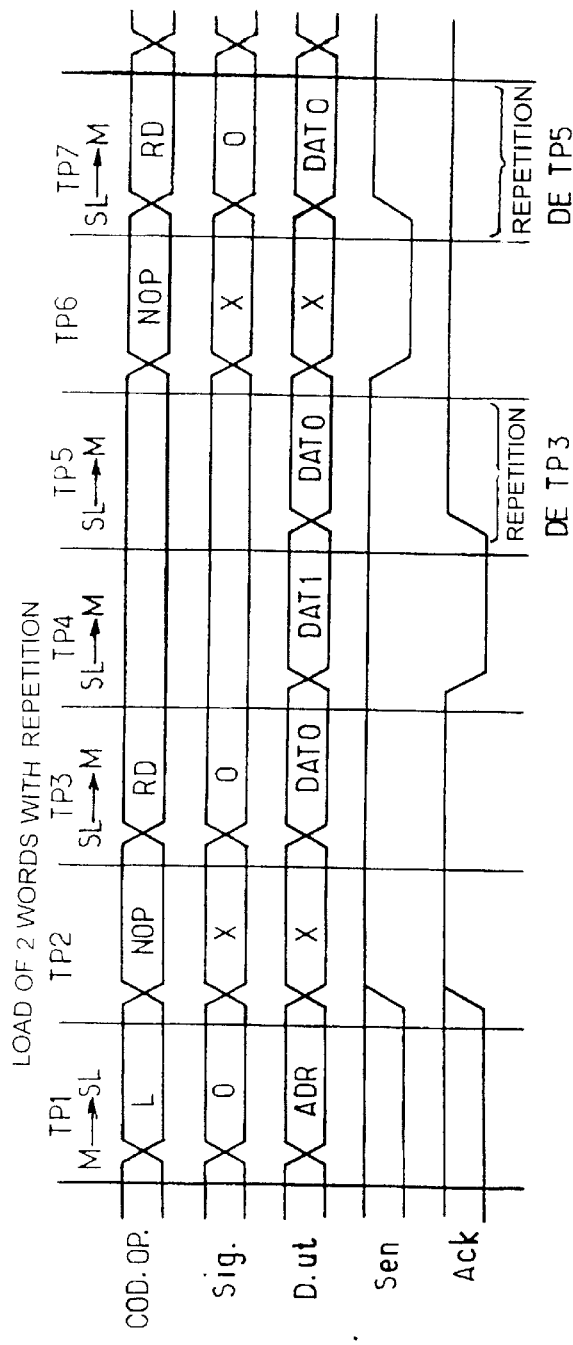
Figure 5D:
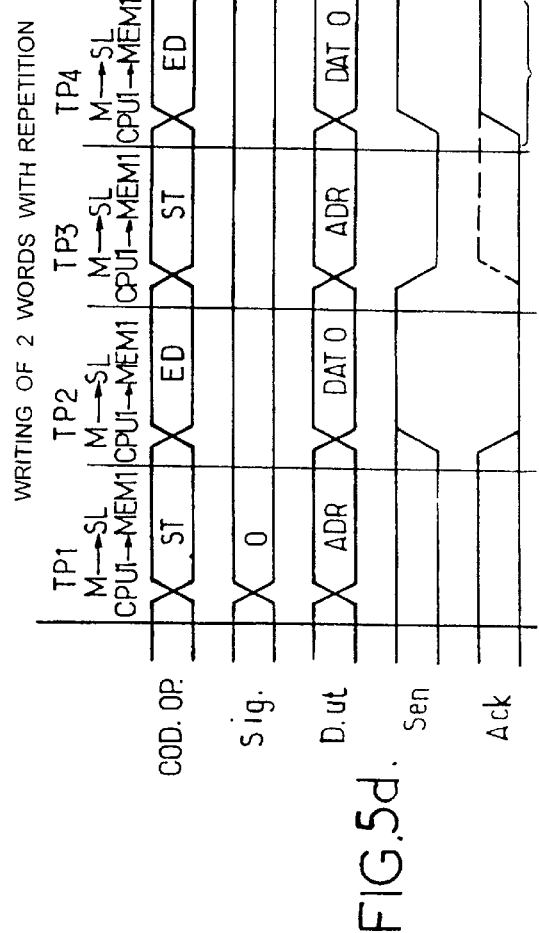

FIGS. 5c and 5d show, as a non-restrictive example, a situation in which the transmission of data between components is not validly executed, either by virtue of a message transmission fault between the master component M and the slave component SL, the proof of transmission message being then at the complemented value of the true value, or, on the contrary, by virtue of an execution or reception fault of any instruction by the slave component, the acknowledgement message being then at the complemented value of the true value.

FIG. 5c corresponds in particular to a load instruction of useful data constituted by two words, each word clearly being encoded on the N bits of the main field. It is clearly understood that for any message constituted by a plurality of words, it is necessary to transmit successive response messages, which can be interlaced on subsequent clock cycles with other instruction or response messages, as already previously mentioned in conjunction with FIG. 5b.

In the situation shown in FIG. 5c, it is indicated that the first partial transaction $TP_1$ corresponds to a load instruction deemed validly executed, the proof of transmission and acknowledgement messages being at the true value on the following partial transaction $TP_2$. As a non-restrictive example, the aforementioned transaction $TP_2$ corresponds for example to an arbitrary transaction having an operation code NOP. The following partial transaction $TP_3$ corresponds to a first response message addressed by the address memory ADR the value of which is contained in the useful data field of the first partial transaction $TP_1$. Clearly it is understood that this first response message includes an operation code RD indicating the existence of response data, a signature value in the signature field identical to that of the value contained in the signature field of the first partial transaction $TP_1$, and lastly the first useful data word denoted $DAT_0$, which is therefore transmitted to the load initiating master component M. During the partial transaction $TP_3$, the proof of transmission and acknowledgement messages are deemed at the true value, the previous partial transaction $TP_2$ having been deemed executed.

At the time of the following partial transaction $TP_4$, a second response message from the addressee memory of the load request is executed. This second response message is normally intended to transmit the second constituent word of the complete useful data message. The response message of the partial transaction $TP_4$ thus includes a same operation code RD as the previous message, transaction $TP_3$, a same signature value in the signature field since, both the master component and the slave component and the transaction are identical, only the rank of the word to be transmitted being different. The main useful data field includes the second word, denoted $DAT_1$.

As regards however the values of the fields of proof of transmission and acknowledgement messages, it is shown that, although the proof of transmission message is at the true value, the acknowledgement message of the partial transaction $TP_4$ is deemed at the complemented value of this true value by virtue of the fact that the transmission response message of the first word $DAT_0$ transmitted by the slave component to the master component during the transaction $TP_3$ is deemed not to have been received by the aforementioned master component.

In these conditions, the response message aiming to transmit the first data word $DAT_0$ can then be repeated in the following partial transaction $TP_5$. Clearly the repetition message includes an identical operation code RD, an identical signature value equal to zero for the reasons previously indicated, and a useful data field corresponding to the first word $DAT_0$. It is mentioned however that the transmission and reception of the second word $DAT_1$ having been deemed executed in the previous partial transaction $TP_4$, the proof of transmission and acknowledgement messages of the partial transaction $TP_5$ are deemed at the true value.

The following partial transaction $TP_6$ is deemed constituted by an arbitrary transaction the operation code of which is NOP.

However, and purely as an example, the partial transaction $TP_5$ of transmission message repetition of the first word $DAT_0$ is deemed not to have been executed following for example a first word $DAT_0$ transmission error by the slave component, i.e. by the memory $Mem_1$ for example. In these conditions, the response message relating to the transmission of the first word $DAT_0$ is then repeated again at the time of the following partial transaction $TP_7$, which then comprises the operation code RD, the same zero signature value as during the partial transactions $TP_1$, $TP_3$ to $TP_5$, and, clearly, the repeated word $DAT_0$. The response partial transaction $TP_7$ is itself deemed, in the example in FIG. 5c, validly executed.

In FIG. 5c, it is shown that the control field enabling the management of successive partial transactions and, if need be, the transmission of different constituent words of a complete message, has not been shown so as not to overload the drawing. Clearly it is understood that, as regards the slave component SL for example, the control field of the instruction message received comprising the number of constituent words of the total message, is stored in the internal structures of the slave component so as to make an address shift counter enabling the different words to be successively read and transmitted.

FIG. 5d goes back, as a non-restrictive example, to a similar situation to that in FIG. 5c in which however the repeated instruction concerns no longer the loading but the writing of two words for example.

As will be able to be observed in FIG. 5d, the write instruction message is transmitted by the master component during the partial transaction $TP_1$, this instruction message comprising the corresponding operation code, signature and ADR address attributes.

At the time of the following partial transaction $TP_2$, the slave component with the address ADR does not confirm reception of the corresponding write instruction, the acknowledgement message Ack being consequently at the complemented value of the true value, value zero. The data response message $DAT_0$ which possibly has been transmitted completely or not during the partial transaction $TP_2$ by the master component is in its turn not confirmed by the proof of transmission message Sen in the following partial transaction $TP_3$. During this aforementioned partial transaction, the write instruction is repeated by the master component to the slave component concerned. The instruction message clearly includes an operation code field ST, the signature value in the signature field corresponding to the same value as during the partial transaction $TP_1$, and clearly, in the useful data field, the same address value ADR which will enable the write instruction operation to be repeated.

Transmission of the first data word $DAT_0$ in the partial transaction $TP_2$ not having been confirmed, notably on account of the complemented value of the true value, value zero, of the proof of transmission message, a transmission message of this data by the master component to the slave component, i.e. the cache memory $Mem_1$, is repeated in the following partial transaction $TP_4$. This data transmission message includes the data write operation code ED, the signature value identical to that of previous transactions $TP_1$ to $TP_3$ and clearly the first useful data word to be entered $DAT_0$. The write instruction message repeated in the partial transaction $TP_3$ having been deemed validly executed during the following partial transaction $TP_4$, the proof of transmission and acknowledgement messages are again at the true value.

The following partial transaction $TP_5$ also concerns a transmission message of the second data word $DAT_1$. This message includes, in the same way as the previous transmission message in the partial transaction $TP_4$, the same operation code and signature attributes, and clearly, in the useful data field, the aforementioned word $DAT_1$.

As a non-restrictive example, the following partial transaction $TP_6$ is deemed constituted by an arbitrary transaction comprising an operation code NOP, the signature and data messages fields not being significant and shown as X. During this partial transaction $TP_5$, the value of the proof of transmission and acknowledgement messages fields is deemed at the true value, the transmission of the second data word to be entered $DAT_1$ having been deemed suitably executed.

Lastly, the final partial transaction $TP_7$ consists of a response transaction of the slave component SL, i.e. the memory $Mem_1$, which addresses a status response message to the master component concerned. Clearly this status response message includes the status response operation code RST, the signature value zero, identical. The main field does not comprise significant data, and, thereby, is denoted X.

What is claimed is:

1. An internal BUS link system between the different constituent components of a micro-controller, these components clocked by a clock signal exchanging during a transaction on each clock cycle at least one useful data word encoded on N bits between a request generator component, denoted the master component, and an addressee receiver component, denoted the slave component, wherein said link is made by means of at least one N+p bits BUS link, each link enabling the generation of instruction messages encoded on N+p bits comprising, at least, on a same current clock cycle:

a main field comprising a useful data word encoded on N bits communicated by the master component to the slave component;

an auxiliary field encoded on p bits, this auxiliary field comprising at least one operation code field enabling identification of the instruction message and a signature field enabling identification of the master component and the slave component addressee of this instruction message as well as the transaction occurring between said master component and said slave component, and, on a clock cycle following said current clock cycle:

a proof of transmission message field from the master component to said slave component and an acknowledgement message field from said slave component to said master component, the true value of said proof of transmission message and the true value of said acknowledgement message enabling validation of a partial transaction between said master component and said slave component, thereby allowing to ensure from each master or slave component the successive transmission of instruction messages on successive instruction cycles to an addressee slave or master component, in accordance with a succession of partial transactions constituent of one transaction.

2. The system in accordance with claim 1, wherein each master or slave component interconnected with each BUS link comprises in addition a first and a second instruction message transmission register and an instruction message reception register.

3. The system in accordance with claim 1, wherein the proof of transmission message field and the acknowledgement message field are each encoded on 1 bit.

4. The system in accordance with claim 1, wherein each master or slave component being allotted a transaction priority order, said system includes in addition a unidirectional link between said components, said unidirectional link enabling each transaction priority order component to address to all lower priority order master-slave components an authorization or absence of authorization of transaction message, each component of given priority order being allowed to operate a transaction under conditional authorization by all the priority order components higher than said given priority order, and the minimum priority order component receiving all the transaction authorization messages delivered by said higher priority order components and being allowed either to operate no transaction, or to operate at least one arbitrary transaction under conditional authorization of all the higher priority order components.

5. The system in accordance with claim 1, wherein each constituent component of said micro-controller is interconnected by means of two N+p bits BUS links with another component of said micro-controller with a common N+p bits BUS link respectively by means of an interfacing circuit, said two N+p bits BUS links enabling thus the throughput of data transmitted between components of said micro-controller and the rate of processing this data by said micro-controller to be increased.

6. The system in accordance with claim 4, wherein said unidirectional link has a cascade structure, each component to which a given priority order has been attributed being interconnected unidirectionally with any component to which a priority order lower than this latter has been attributed, thereby enabling any risk of conflict of access of said components to be eliminated.

7. A protocol of digital data transmission between the constituent components of a micro-controller, each component being interconnected with another component by means of at least one parallel type BUS link allowing, during a transaction, the transmission of successive messages, constituent of a partial transaction between two of these components, in accordance with a synchronous transmission clocked from a clock signal, succession of a plurality of clock cycles, wherein said protocol consists at least in:

transmitting, from a request transmitting component, denoted master component, to an addressee receiving component, denoted slave component, on a current clock cycle, an instruction message, encoded on N+p bits, said instruction message comprising at least, on the one hand, a main field encoded on N bits, and containing a useful data word, communicated by said master component to said slave component, and, on the other hand, an auxiliary field comprising at least one operation code field enabling identification of said instruction message and a signature field enabling identification of said master component and said slave component addressee of said instruction message as well as the transaction occurring between said master component and said slave component;

transmitting, simultaneously, on the clock cycle following said current clock cycle, a proof of transmission message from said master component to said slave component and an acknowledgement message from said slave component to said master component, the true value of said proof of transmission message and the true value of said acknowledgement message enabling said partial transaction to be validated;

repeating the previous stages on at least one clock cycle subsequent to said current clock cycle between the same pair of master-slave components and between at least one other pair of master-slave components so as to ensure the execution of partial transactions, constituent of successive transactions between these pairs of master-slave components.

8. The protocol in accordance with claim 7, wherein each of said constituent components of said micro-controller being allotted a set of different dedicated addresses, and to each instruction message being assigned an operation code in said operation code field, said protocol consists in transmitting, from said master component to said slave component a qualified signature in said signature field, said qualified signature being representative of said master component, said partial transaction and said transaction generated by this master component to said slave component.

9. The protocol in accordance with claim 8, wherein said useful data word contained in the main field is constituted by an address data word of said slave component or by a digital data word to be read or stored, said useful data word of the first partial transaction between said master component and said slave component being constituted by the address data of said slave component, all subsequent partial transactions between the same pair of master-slave components comprising a useful data word constituted by digital data to be read or stored.

10. The protocol in accordance with claim 7, wherein said auxiliary field comprises in addition a control field, enabling each partial transaction and each transaction to be managed.

11. The protocol in accordance with claim 7 further consisting in addition:

in allocating to each constituent component of said micro-controller a transaction priority order, and, during exchanges of instruction messages each constituting a partial transaction between pairs of master-slave components of said micro-controller, in transmitting, from each higher priority order component, an authorization or absence of authorization of transaction message to all the lower priority order master-slave components, each component of given priority order being allowed to operate a transaction under conditional authorization by all the components of priority order higher than this said given priority order, and the minimum component of priority order receiving all the transaction authorization messages delivered by said components of higher priority order, and being thus allowed either to operate no transaction, or to operate at least one arbitrary transaction under conditional authorization of all the components of higher priority order.

12. The protocol in accordance with claim 7 wherein each useful data word is encoded on N=32 bits, each auxiliary field comprising at least 16 bits.

* * * * *